Jan. 22, 1963
H. K. GRAVES
3,074,335
AUTOMATIC EXPOSURE CONTROL
Filed Oct. 2, 1958
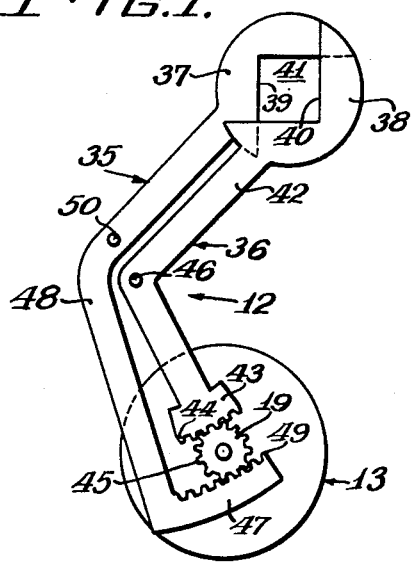
Fig.1.
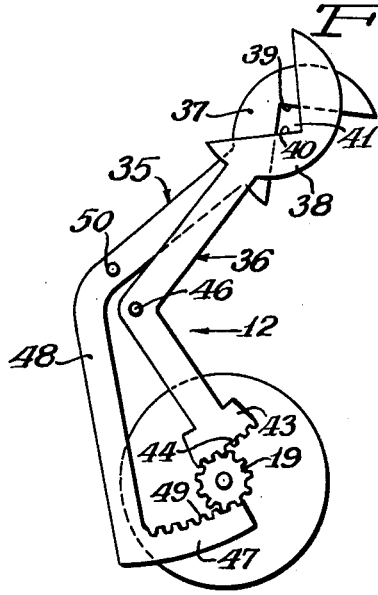
Fig.2.
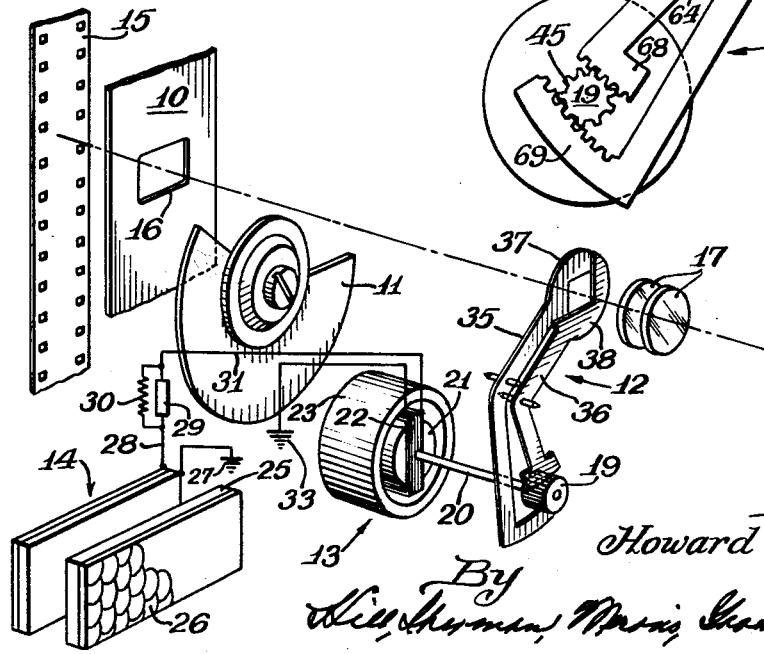
Fig.3.
Fig.4.
Inventor:
Howard K. Graves
By
Kies, Sherman, Meroni, Gross & Simpson Attys.

3,074,335
AUTOMATIC EXPOSURE CONTROL
Howard K. Graves, Morton Grove, Ill., assignor to Bell & Howell Company, Chicago, Ill., a corporation of Illinois
Filed Oct. 2, 1958, Ser. No. 764,825
3 Claims. (Cl. 95—64)

This invention relates to photographic cameras and more particularly relates to a means for controlling the relative size and shape of the diaphragm opening therein.

Heretofore many and varied means have been devised for controlling the size of the diaphragm opening for selectively restricting and enlarging the cross-sectional area of the light passage intermediate the light receiving aperture in the camera and the film to be exposed. Such means generally comprise a plurality of iris members which are selectively movable to restrict or enlarge the diaphragm opening and which may be automatically or manually adjusted.

Particularly in connection with cameras embodying a means for automatically adjustably moving the iris members, it has been found difficult to properly locate the iris members and the automatic control mechanism therefore, due to the confinement of a great multiplicity of parts in a small area. Accordingly, applicant hereinafter discloses in detail a diaphragm opening control mechanism which obviates the disadvantageous feature mentioned above and which comprises a mechanism wherein the controlling iris blades are spaced remotely from the automatic control mechanism and wherein the interconnection between the control mechanism and the iris blades is made with a pair of lever arms which may be suitably formed to fit about other camera parts in any desired manner.

It is advantageous, as is well known in the art, to provide a means for increasing and decreasing the area of the diaphragm opening in such a manner that the opening maintains a substantially rectangular configuration in order to reduce vignetting of the light image impinged on the film.

Prior attempts to provide a substantially rectangularly shaped adjustable diaphragm opening have, however, in general, met with little success particularly when arranged to be associated with automatic exposure mechanisms. However, in applicant's invention, which is hereafter described with particularity, there is provided a means for adjusting the size of the diaphragm opening in a unique manner so as to maintain a nearly rectangular diaphragm opening under all light conditions.

In the embodiments of the invention illustrated in the drawing appended hereto, each of the iris blades is formed with a right angular cut-out formed by two adjacent edge portions of each blade and the blades are so positioned with respect to one another that the diaphragm opening between the cooperating blades formed by the edges defining the cut-out is substantially rectangular when the blades are in an intermediate position, so that upon movement of the blades to either of two opposed extreme positions the configuration of the diaphragm opening will not be substantially altered.

In the illustrated embodiments of the present invention each of the drive arms or levers for the pivotally movable iris blades is driven off the same gear head but each of the lever arms is pivoted about its own axis so that pivotal movement of the iris blades will be effected in a proper ratio to thereby minimize the distortion of the exposure aperture and center the diaphragm opening about the central axis of the light passage when the blades are moved from an intermediate position.

It will, of course, be understood that the particular diaphragm aperture control mechanism which is shown and described herein is not limited to use with an automatic control mechanism but may also be utilized in association with a manual control system.

Accordingly, it is a principal object of the present invention to provide an improved means for controlling the size and shape of a diaphragm opening within a photographic camera.

Yet another object of the invention is to provide novel means for adjusting the area of the diaphragm opening in such a manner that the opening maintains a generally rectangular configuration.

A further object of the invention is to provide a diaphragm opening control mechanism including a pair of movable iris blades wherein the cooperating iris blades are disposed at one end of relatively long arms, which arms are pivoted near the center thereof and adjustably moved from opposite ends.

A still further object of the invention is to provide a novel diaphragm opening control mechanism which will more effectively utilize the confined space within a photographic camera than has heretofore been possible.

These and other objects of the invention will appear from time to time as the following specification proceeds and with reference to the accompanying drawings, wherein:

FIGURE 1 is a front elevational view of a diaphragm opening control mechanism constructed in accordance with the principles of the present invention and showing the iris blades and power means connected therewith in an intermediate position;

FIGURE 2 is a front elevational view of the control assembly illustrated in FIGURE 1 but showing the iris blades and their power means in a second position;

FIGURE 3 is an exploded diagrammatic view of the exposure control mechanism which is partially illustrated in FIGURES 1 and 2 together with parts of the camera related thereto and including the circuit diagram of the control; and FIGURE 4 is a rear elevational view of a second embodiment of the invention.

Referring particularly to FIGURE 3 of the drawings, there is shown an exploded view of an exposure control mechanism constructed in accordance with the principles of the present invention which comprises generally a guide plate 10, a rotary shutter 11, a pair of iris members 12, a galvanometer 13, and a photoelectric cell 14.

A standard motion picture film 15 is guided against the rear face of the plate 10 which, in turn, is provided with a horizontally elongated rectangular exposure aperture 16 therein which is conformable in configuration with a standard motion picture frame, and through which successive frames of the film are exposed as the film is intermittently fed through an exposure guide. The rotary shutter 11 is disposed immediately in front of the guide plate 10 and is rotated in timed relation with the intermediate feed of the film to cover the exposure aperture 16 during the film feed intervals in a manner which is well known in the art.

The iris members 12 which form the subject of the present invention are mounted for pivotal movement in a manner which will hereinafter be more fully described in detail to vary the cross-sectional area of the light passage extending between the aperture 16 and a pair of light receiving lenses 17 and are arranged to be pivotally driven by a gear member 19 through a power shaft 20 which is mounted on a rotary permanent magnet 21 of the galvanometer 13 for corotational movement therewith.

The galvanometer is of usual construction and comprises in addition to the rotary permanent magnet 21, a pivoted rectangular circuit coil 22 surrounding the magnet 21 and spring biased to a zero position by springs (not shown), and a ring 23 of magnetic material surrounding the coil and serving to concentrate the magnetic field of the magnet. It will, of course, be understood that the galvanometer is so positioned that the pivotal axis of the coil is normal to the plane of the exposure aperture 16.

The forwardly facing photoelectric cell 14 is mounted in the camera and has the usual light controlling baffle 25 disposed in front of the cell and the usual reticular lens 26 secured in front of the baffle by suitable securing means.

The circuit coil of the galvanometer is connected in circuit with the photoelectric cell 14 so that the coil is deflected from its spring biased zero position by current derived from the photoelectric cell in proportion to the intensity of light impinging on the photoelectric cell, the photoelectric cell and galvanometer circuit comprising one terminal of the photoelectric cell connected, as designated at 27, to the metal framework of the mechanism, which framework is for convenience referred to as "ground," the other terminal of the cell connected by a conductor 28 to one terminal of a resistor 29 and of a resistor 30 which is connected in shunt with the resistor 29. The other terminals of these resistors are connected by a conductor 31 to one terminal of the circuit coil 22 of the galvanometer 13, and the terminal of this coil is connected to ground as designated at 33.

The purpose of the resistors 29 and 30 is to compensate for the positive temperature coefficient of resistance of the photoelectric cell and the galvanometer circuit per se so that the deflection of the circuit coil 22 is approximately uniform throughout the range of temperature normally encountered in use, as from zero to 100° F., and for this purpose the resistor 29, commercially known as a thermistor, has a negative temperature coefficient of resistance greater than the positive temperature coefficient of resistance of the photoelectric cell and galvanometer circuit per se, and the resistor 30, serving as a modifying resistor, has a temperature coefficient of resistance lying between the positive temperature coefficient of resistance of the photoelectric cell and galvanometer circuit per se and the negative temperature coefficient of resistance of the thermistor 29, the characteristics of these resistances being selected to obtain the aforesaid compensation, as fully described and claimed in copending application for U.S. Patent of Mervin W. La Rue, Jr., and William W. Whightman, Serial No. 628,753 filed December 17, 1956, for "Exposure Control for Photographic Cameras," now Patent No. 2,996,965, and assigned to the assignee hereof.

The details of the iris blade assembly illustrated in FIGURE 3 may be more fully understood from a consideration of FIGURES 1 and 2. The iris member assembly 12 is shown as including a first iris member 35 and a second iris member 36 which are in the form of bell-crank arms having toothed racks 44 and 49 at their lower ends and iris blades 37 and 38 at their opposite ends.

The iris blades 37, 38 each have a right angular cut-out 39 and 40 formed by two adjacent edges and are arranged so that when the blades 37 and 38 are in overlapping relationship with one another a diaphragm opening 41 is defined thereby through which light passes from the lenses 17 to the film 15.

It will be noted that the short, elbow shaped drive lever arm or bell-crank 42 of iris member 36 has an arcuately shaped gear segment 43 on the lower end thereof which has a plurality of teeth 44 to form the rack previously referred to. These teeth are arranged to mesh with teeth 45 of the gear 19. The arm 42 is pivotally mounted on a pivot pin 46 for corotational movement therewith and the pin 46 is, in turn, adapted to be journaled in a pair of substantially anti-friction bearings (not shown).

The particular elbow like configuration of the arm 42 illustrated in FIGURES 1 and 2 is provided to fit the lever arm about other camera parts intermediate the iris blades and the gear head 19 so that the confined space within the camera can be used most effectively.

The lever arm 48 of iris member 35 also has an arcuately shaped gear segment 47 formed on one end thereof which, like the gear segment 43, has a plurality of gear teeth 49 formed therein along the arcuate edge thereof which extends at right angles to the lower portion of the arm 48. These teeth 49 are arranged to mesh with teeth 45 of the gear 19. The lever arm 48, like the lever arm 42, is arranged to be pivotally mounted about an axis extending through a portion of the arm intermediate its ends, the two pivot points, however, being displaced from each other. To this end a pivot pin 50 is provided similarly mounted as described with reference to pivot pin 46.

It should be understood that if both of the lever arms were pivotally driven from opposite sides of the same gear and were pivoted about a single axis the upper end of one bell-crank arm would move faster than the other and over a greater angular distance. Such an arrangement would be impossible to use as an exposure control since the center of the aperture would shift laterally.

The applicant overcame this problem by providing separate pivots therefor and maintaining the ratio of the respective upper and lower arm portions the same. That is the ratio of the distance between pivot 50 and the center of aperture 41 to the distance between pivot 50 and the gear rack 49 must be substantially the same as the ratio of the distance between pivot 46 and the center of aperture 41 to the distance between pivot 46 and gear rack 44. By maintaining these respective ratios the same the pivot pins 46 and 50 can be shifted radically within the camera assembly without causing any shift in the center of the aperture control opening 41 and without causing any differential in the linear speed of movement of the iris blades 37 and 38. Note that angular movement of coil 22 causes movement of the iris members 35, 36 in timed relation, to vary the diaphragm opening 41 when light impinges on the photoelectric cell 14. This is because the voltage impressed across coil 22 from the photoelectric cell 14 in accordance with the intensity of the light causes a movement thereof in proportion to the light intensity and in turn effects a corresponding movement of the iris members 35, 36, to provide a diaphragm opening 41 corresponding with the intensity of the light impinging on the photoelectric cell 14.

Accordingly, if the iris members 35, 36 are assumed to be initially in the intermediate position illustrated in FIGURE 1, an increase in the intensity of light impinging on the photoelectric cell 14 will effect clockwise rotatable movement (as shown in FIGURES 1 and 2) of the power shaft 20 and the gear 19, and such rotatable movement will move the lever arm 42 and the iris blade 38 connected therewith in a counter-clockwise direction about the pivot pin 46 and, conversely, will move the lever arm 48 and the iris blade 37 connected therewith in a clockwise direction about the pivot pin 50 to a position such as is shown in FIGURE 2, to thereby substantially decrease the area of the diaphragm opening. It will, of course, be particularly noted in FIGURE 2 that the iris blades 37, 38 have each moved through equal arcs so that the diaphragm opening 41 is still located concentrically of the center axis of the light passage.

It will be understood that the lengths, shapes, and points of pivotal connection of the lever arms 42, 48 may be varied within relatively wide limits as desired to provide an elongated rather than a square diaphragm opening.

It will further be noted that a plurality of abutment members may be provided for the lever arms 42, 48 to act as stops to prevent pivotal movement of the arcuate gear heads 43, 47 out of engagement with the drive gear head 19.

The embodiment of the invention shown in FIGURE 4 illustrates the fact that the diaphragm arms may assume widely different shapes without departing from the invention. As shown in FIGURE 4 a pair of iris members 60, 61 are shown as comprising iris blades 62, and 63, respectively, which are identical in nature with the iris blades 37 and 38 illustrated in FIGURES 1 and 2 and which have lever arms 64 and 65, respectively. In this particular embodiment of the invention the lever arm 64 is straight and is pivoted about a pin 66 spaced medially along the arm while the drive arm 65 is formed angularly and is pivoted at its elbow by a pin 67. Each of the arms 64 and 65 have arcuately shaped gear segments 68 and 69, respectively, formed at the lower end thereof which have a plurality of teeth formed in the arcuate faces thereof arranged to mesh with the teeth 45 on the gear 19.

In this particular embodiment of the invention, as with the embodiment of the invention illustrated in FIGURES 1 to 3, the ratios previously described must be maintained. This can be accomplished by appropriately locating the respective pivot points of the two diaphragm supporting arms.

Here, as before when the intensity of the light impinging on the photoelectric cell 14 increases substantially, the gear 19 will be rotated in a counter-clockwise direction as viewed in FIGURE 4 and the iris members 60 and 61 will be moved pivotally about the pins 66 and 67 to thereby move the iris members 62 and 63 toward one another to decrease the effective area of the diaphragm opening.

Thus, in view of the foregoing, it will be understood that applicant has provided a diaphragm opening control means wherein the iris blades for varying the effective area of the diaphragm opening are positioned remotely from the power means for moving the iris blades and wherein the lever arms or motion translation means between the power means and the iris blades may be formed in a variety of shapes to thereby utilize most effectively the confined spaced within a camera.

It will, further be understood that by varying the pivotal axes of the drive arms or by varying the lengths or shapes thereof, the relative shape of the diaphragm opening can be varied to fit the particular need of the camera with which it is to be associated.

Another important aspect of the invention is that a diaphragm opening control means has been provided which is operable to maintain a substantially rectangular diaphragm opening through all positions of the iris members, while maintaining the center of the aperture opening in a fixed position.

It will herein be understood, of course, that these embodiments of the invention have been used for illustrative purposes only and that various modifications and variations in the present invention may be effected without departing from the spirit and scope of the novel concepts thereof.

I claim as my invention:

1. In combination in a photographic camera having a film exposing aperture, diaphragm means for adjusting the relative amount of light reaching said aperture comprising a pair of iris blades having cooperating edges arranged to define an adjustable light opening therethrough in line with the optic axis of said aperture, a pair of arms each supporting one of said iris blades at one end thereof, each of said arms being mounted intermediate its ends for pivotal movement in a plane substantially normal to the optic axis of said aperture, the pivot points of said arms being spaced from one another and at different distances from said optic axis of said aperture, and means for engaging the opposite ends of said arms to angularly shift the same, the ratio of the distances from the pivot point of one of said arms to its opposite end and to said optic axis being substantially the same as the ratio of the distances from the pivot point of the other of said arms to its opposite end and to said optic axis, said engaging means being a rotatable pinion and said opposite ends of said arms being in the form of gear racks meshing with said pinion.

2. In combination in a photographic camera having a film exposing aperture, diaphragm means for adjusting the relative amount of light reaching said aperture comprising a pair of iris blades having cooperating edges arranged to define an adjustable light opening therethrough in line with the optic axis of said aperture, a pair of arms each supporting one of said iris blades at one end thereof, each of said arms being mounted intermediate its ends for pivotal movement in a plane substantially normal to the optic axis of said aperture, the pivot points of said arms being spaced from one another and at different distances from said optic axis of said aperture, and means for engaging the opposite ends of said arms to angularly shift the same, the ratio of the distances from the pivot point of one of said arms to its opposite end and to said optic axis being substantially the same as the ratio of the distances from the pivot point of the other of said arms to its opposite end and to said optic axis, said engaging means being a rotatable pinion and said opposite ends of said arms being in the form of gear racks meshing with opposite sides of said pinion and extending in the direction of the respective paths of movement of said opposite ends of said arms.

3. In combination in a moving picture camera having a film exposing aperture, a film transport mechanism for transporting film past said aperture, diaphragm means for adjusting the relative amount of light reaching said aperture comprising a pair of iris blades having cooperating edges arranged to define an adjustable light opening therethrough in line with the optic axis of said aperture, a pair of arms each supporting one of said iris blades at one end thereof, each of said arms being mounted intermediate its ends for pivotal movement in a plane substantially normal to the optic axis of said aperture, the pivot points of said arms being spaced from one another and at different distances from said optic axis of said aperture, and means for engaging the opposite ends of said arms to angularly shift the same, the ratio of the distances from the pivot point of one of said arms to its opposite end and to said optic axis being substantially the same as the ratio of the distances from the pivot point of the other of said arms to its opposite end and to said optic axis, said engaging means being a rotatable pinion and said opposite ends of said arms being in the form of gear racks meshing with opposite sides of said pinion and extending in the direction of the respective paths of movement of said opposite ends of said arms, a photoelectric cell, electro-mechanical transducing means providing a mechanical element movable in response to variations in the electrical output of said cell, said mechanical element being directly connected to rotate said pinion.

References Cited in the file of this patent

UNITED STATES PATENTS

| 1,247,682 | Howell | Nov. 27, 1917 |
| 2,013,362 | Rizdorfer | Sept. 3, 1935 |
| 2,556,546 | Lee | June 12, 1951 |
| 2,580,324 | Schwarz | Dec. 25, 1951 |
| 2,841,064 | Bagby et al. | July 1, 1958 |

FOREIGN PATENTS

| 698,573 | Great Britain | Oct. 21, 1953 |